(12) United States Patent
Chen et al.

(10) Patent No.: US 9,055,838 B2
(45) Date of Patent: Jun. 16, 2015

(54) PORTABLE SLOW COOKER

(71) Applicants: Pingtao Chen, Foshan (CN); Jinshui Wu, Foshan (CN)

(72) Inventors: Pingtao Chen, Foshan (CN); Jinshui Wu, Foshan (CN)

(73) Assignee: Midea Group Co., Ltd. (CN)

( * ) Notice: Subject to any disclaimer, the term of this patent is extended or adjusted under 35 U.S.C. 154(b) by 186 days.

(21) Appl. No.: 13/659,058

(22) Filed: Oct. 24, 2012

(65) Prior Publication Data

US 2013/0098922 A1    Apr. 25, 2013

(30) Foreign Application Priority Data

Oct. 25, 2011 (CN) .................. 2011 2 0410661 U

(51) Int. Cl.
*A47J 36/10*    (2006.01)

(52) U.S. Cl.
CPC ........................ *A47J 36/10* (2013.01)

(58) Field of Classification Search
CPC ...... B65D 25/2852; B65D 25/32; A47J 36/10
USPC ................ 220/314, 317, 318, 322, 326, 426,
220/573.1, 573.4, 756, 757, 762, 763, 764,
220/770, 775, 776, 912, 773
See application file for complete search history.

(56) References Cited

U.S. PATENT DOCUMENTS

| | | | | |
|---|---|---|---|---|
| 323,101 A | * | 7/1885 | Bard | 215/287 |
| 661,050 A | * | 11/1900 | Hoffman | 220/263 |
| 912,095 A | * | 2/1909 | Eason | 220/756 |
| 1,328,672 A | * | 1/1920 | Hirsohn | 220/811 |
| 1,362,933 A | * | 12/1920 | Ferdon | 220/8 |
| 1,410,515 A | * | 3/1922 | Saddlemire | 215/284 |
| 2,098,858 A | * | 11/1937 | Busson et al. | 220/322 |
| 2,427,004 A | * | 9/1947 | Kampf | 220/763 |
| 2,501,572 A | * | 3/1950 | Marquez | 220/521 |
| 2,661,974 A | * | 12/1953 | Zehnder | 292/258 |
| 2,749,143 A | * | 6/1956 | Chika | 280/751 |
| 2,984,511 A | * | 5/1961 | Hedrick | 292/258 |
| 3,144,016 A | * | 8/1964 | Basci | 126/265 |
| 3,257,120 A | * | 6/1966 | Browning | 280/47.17 |
| 3,363,924 A | * | 1/1968 | Remig | 292/258 |
| 4,185,752 A | * | 1/1980 | Basile | 220/314 |
| 4,241,846 A | * | 12/1980 | Murphy | 220/318 |
| 4,388,873 A | * | 6/1983 | Carleton et al. | 105/377.11 |
| 4,476,994 A | * | 10/1984 | Hope et al. | 220/318 |

(Continued)

FOREIGN PATENT DOCUMENTS

CN    201542396 U    8/2010
CN    101036559 B    12/2010

*Primary Examiner* — Fenn Mathew
*Assistant Examiner* — Chetan Chandra
(74) *Attorney, Agent, or Firm* — Finnegan, Henderson, Farabow, Garrett & Dunner LLP

(57) ABSTRACT

A new portable slow cooker capable of engaging a lid and a liner container can is provided to prevent the soup from spilling out. The structure of the present invention comprises a cooking body, a liner container, a lid and a handle, wherein the liner container is disposed within the cooking body, and the lid is disposed on the opening of the liner container. The handle is spanned over the lid and has, lower ends in vertically slidable cooperation with handle boxes disposed at aside surface of the cooking body. The handle is locked by the handle boxes when slides to an lowest position, so as to press the lid to form a sealing engagement with the liner container. As long as the handle is pushed to the lowest position, being locked, the lid and the liner. container can be engaged to prevent the soup from spilling out.

7 Claims, 12 Drawing Sheets

(56) References Cited

U.S. PATENT DOCUMENTS

| | | | |
|---|---|---|---|
| 4,545,501 A * | 10/1985 | DeFord | 220/318 |
| 5,044,513 A * | 9/1991 | Van Berne | 220/318 |
| 5,050,760 A * | 9/1991 | Garcia | 220/751 |
| 5,263,727 A * | 11/1993 | Libit et al. | 280/40 |
| D496,531 S * | 9/2004 | Einav et al. | D3/276 |
| 7,140,506 B1 * | 11/2006 | Brady et al. | 220/315 |
| 7,140,635 B2 * | 11/2006 | Johnson et al. | 280/646 |
| 7,246,718 B2 * | 7/2007 | Einav et al. | 220/764 |
| 7,784,816 B2 * | 8/2010 | Jian et al. | 280/651 |
| D657,611 S * | 4/2012 | Bock | D7/354 |
| 8,584,894 B1 * | 11/2013 | Mulvaney et al. | 220/756 |
| 8,770,598 B2 * | 7/2014 | Li | 280/40 |
| 2004/0065666 A1 * | 4/2004 | Walker | 220/315 |
| 2005/0072789 A1 * | 4/2005 | Einav et al. | 220/756 |
| 2007/0210061 A1 | 9/2007 | Tynes et al. | |
| 2009/0039071 A1 * | 2/2009 | Tynes et al. | 219/433 |
| 2013/0098921 A1 * | 4/2013 | Yang et al. | 220/573.1 |
| 2013/0098922 A1 * | 4/2013 | Chen et al. | 220/573.4 |
| 2014/0157995 A1 * | 6/2014 | Mulvaney et al. | 99/337 |

* cited by examiner

PORTABLE SLOW COOKER

CROSS-REFERENCE TO RELATED APPLICATION

The present application claims benefit from Chinese utility model application no. 201120410661.3 filed on Oct. 25, 2011 by Midea Group Co., Ltd. The entire disclosure of the application is hereby incorporated herein by reference.

FIELD OF THE INVENTION

The present invention relates to a slow cooker and, in particular, to a portable slow cooker having a multi-functional handle and capable of preventing spillage of cooking content such as soup.

BACKGROUND OF THE INVENTION

Conventional slow cooker comprises a liner container and a lid disposed on the top rim of the container. The lid is typically not securely engaged with the container. The user is likely to move the cooker or the liner container containing food after the food is well cooked. The lid tends to slide off during movement because there is no secure connection between the liner container and the lid. Furthermore, the shaking caused by the movement can possibly cause spillage of the liquid content in the container, and thus may burn the user.

Chinese patent no. CN 200920198406.X discloses a slow cooker having a touch control panel, which comprises a working pot covered by a lid. A handle comprised of an upper part and a lower part is symmetrically fixed near the top edge of working pot. A spring hole is arranged in the middle of the lower part for accommodating a spring and a steel bead. A latch is slidably arranged between the upper and lower parts, and the movement of the latch is limited by the steel bead. A closed sealing ring, made of silicon gel, is arranged below the periphery of the lid to achieve seal connection between the lid and the working pot. The latch provided between the working pot and the lid is used to seal the working pot. However, this design has too many parts, resulting in high cost and difficulty of assembly. Moreover, the latch is subject to large area of friction, causing non-smooth operation. Further, the steel bead is positioned by the elastic force of the spring which may deteriorate during long term use, resulting in high possibility of latch release.

Chinese patent no. CN 200710005602 discloses a slow cooker comprising a housing, a container and a lid. The lid includes a gasket around an outer edge thereof and is shaped and sized to cover the opening of the container. At least one over-the-center clip is mounted to the side all of the housing, the clip being selectively engageable with the lid to retain the lid in sealing engagement with the container, in order to inhibit leakage of the food stuffs from the interior of the container. The clip includes a hook and a lever, the hook being selectively engageable with the lid to selectively retain the lid in sealing engagement with the container. A catch has to be provided to the lid in order to engage the hook of the clip. This will lead to additional cost and more complicated manufacturing process for mounting such a catch, particularly on a glass lid as predominately used in slow cookers.

Additionally, typical slow cooker available on the market, including the slow cookers disclosed in the above patents, are provided with ear-like grips on the two side walls of the housing for moving the slow cooker. Slow cooker with this structure requires to be operated with two hands simultaneously, and is not able to be moved with a single hand.

SUMMARY OUT THE INVENTION

The objective of the present invention is to provide a portable slow cooker capable of engaging a lid and a liner container to inhibit leakage of soup.

The second objective of the present invention is to provide a slow cooker that can be moved with a single hand.

The third objective of the present invention is to provide a slow cooker with a multi-functional handle.

The fourth objective of the present invention is to provide a slow cooker having a handle capable of engage a lid and a liner container.

To achieve the above objective, the below technical solution is adopted in the present invention.

A portable slow cooker, including a cooking body, a liner container, a lid and a handle, is provided in the present invention, wherein the liner container is disposed within the cooking body, and the lid is disposed on the opening of the liner container. The handle is spaned over the lid and has, lower ends in vertically slidable cooperation with handle boxed disposed at a side surface of the cooking body. The handle is locked by the handle boxes when slides to an, so as to press the said lid to form a scaling engagement with the liner container. When using the product of the present invention, the lid and the liner container can be locked by pushing and locking the handle to the lowest position, preventing the soup form spilling out. When the handle is pulled to the highest position, the slow cooker can be easily moved by hand. By delicate designing, the lock device of the lid and the handle are integrated together, simplifying the structures and bringing convenience for users. The lid is locked by the handle in the present invention. Therefore, no further manufacturing is needed for the lid. This is much more easily to manufacture with existing glass lids.

For easy opening of the lid or moving out of the liner container, the handle is rotatable with respect to the handle boxes when it is moved to the highest position by sliding. Therefore, when the handle is pulled to the highest position, it is able to rotate to one side, leaving no disturbance above the lid, making it easy to open the lid and remove the liner container.

To prevent the handle from sliding down to the lowest position to be locked under the gravity force, a restoring mechanism for supporting the handle is provided within the handle box. When the handle is unlocked at the lowest position, it can automatically leave the lowest position, with no need of manual operation, thus it is more easily to operate.

For easy movement with a single hand, the said handle has an inverted U shape, with two lower ends inserted into the handle boxes, to slide upward and downward. The crossbar of the handle is pressed against the lid when the handle is placed at the lowest position. The inverted-U shaped handle is not only convenient for movement with a single hand, but also connected to the two sides of the cooking body, and therefore is uniformly forced to move smoothly to prevent the soup from spilling out.

Typically the lid of the slow cooker is provided with a grip, and preferably, the crossbar of the handle is pressed against the grip of the lid when the handle is at the lowest position. In this way, the grip is pressed by the crossbar, with no direct connection to the lid, so that heat will rarely be transferred to the handle during cooking to prevent high temperature of the handle, and thus is convenient for users.

The handle can be locked at the lowest position via various ways. Two types of structure are provided in the present invention. The first type provides a handle with a lock catch at each of the lower ends, and each of the handle boxes is provided with a flexible pressing buckle, which is match with the said lack catch to lock the handle at the lowest position. Specifically, the said handle box includes a box base, a box lid, a positioning buckle and a trigger, wherein the restoring mechanism is a spring installed within the handle box, which is disposed on the box base. The trigger is rotatably connected to the box lid, and the positioning buckle is rotatably connected to the trigger. A slider that slides within the box base is rotatably connected to the lower end of the handle. This kind of structure is simplified and convenient for users, with strengthened locking force.

Another type provides a handle box with a two-stage positioning mechanism, in correspondence with the highest position and lowest position of the handle respectively. Specifically, each of the handle box includes a box base, a box lid, a positioning buckle, a resetting spring sheet and a trigger. The positioning buckle, the resetting spring sheet and the trigger are installed between the box lid and the box base. The restoring mechanism is a spring installed within the handle box. At one side of the positioning buckle is provided with a two-stage latching position, i.e., a higher one and a lower one. At the other side of the positioning buckle is provided with the resetting spring sheet supporting the positioning buckle. The positioning buckle is pushed by the trigger to press against the resetting spring sheet. A projecting rotate shaft, of which the end is provided with a position-limiting projection, is provided to the lower end of the handle to match with the two stage latching positions. For this kind of structure, the locking force is strengthened. It can be unlocked by pushing the trigger, and thus is convenient for users. Besides, no metal components as what is used in the previous type are required, therefore the temperature during operation can be lowered and make it more safe to operate.

In a word, the handle and the locking device of the lid are delicately integrated as a whole, with simplified structure and strengthened locking force to prevent the soup from spilling out during operation. It is convenient to remove the lid and the liner container and move with a single hand. It requires no further manufacture of the locking component on the lid, and thus is more easily to manufacture, suitable for lid made of any kind of materials, e.g., glass or ceramics. The locking mechanism and the unlocking mechanism are both disposed on the cooking body of the slow cooker, with little heat transferring, protecting the users from being burned during operation, owning to the high efficiency in decreasing the temperatures of these mechanisms. Compared with the prior arts, it is creative with substantive characteristics and obvious progress.

DETAILED DESCRIPTION OF THE EMBODIMENTS

Figure 1:
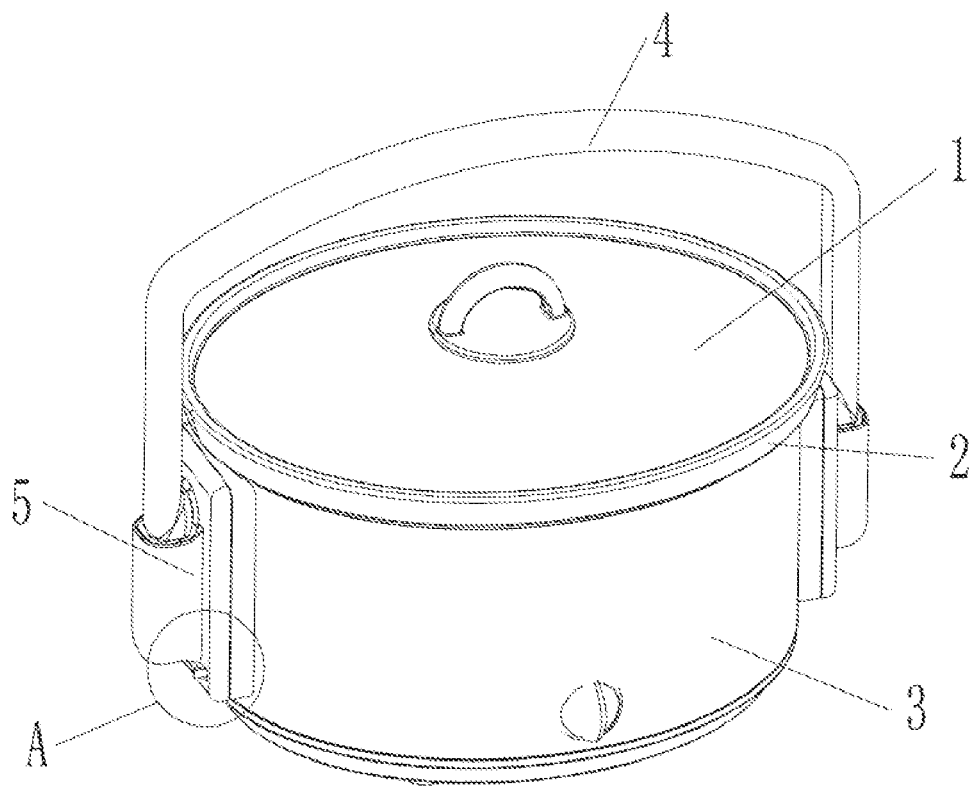
FIG. 1 is a structural installation diagram of the first embodiment.

The present invention is explained in further detail as below with reference to the drawings.

Embodiment 1

The portable slow cooker in this embodiment as show in FIGS. 1 to 14 includes a cooking body 3, a liner container 2 disposed within the cooking body 3, a lid 1 disposed on the liner container 2 covering the opening end of the liner container 2, a handle 4, a handle box 5 fixed on the two end side surface of the cooking body 3, and a sealing ring 6 disposed around the outer rim of the lid 1, and Within the handle box 5 is provided with a handling position and a fixed position. The handle 4 has two lower ends that can remove upward and downward to be fixed in the handle box 5, and selectively be fixed at the handling position or fixed position of the handle box 5, has an inverted U shape, and is disposed over the lid 1. When the two ends of the handle 4 are fixed at the fixed position of the handle box 5, the handle press tightly on the grip of the lid 1, making the lid 1, the sealing ring 6 and the liner container 2 closely joint together, insuring food within the liner container not spill out or pour out. When the two ends of the handle 4 are at the handle position of the handle box 5, the pressing force upon the lid 1 by the handle 4 is released, so that the lid 1 and the liner container 2 can be picked up or placed freely, and the handle 4 can also rotate freely.

Figure 2:
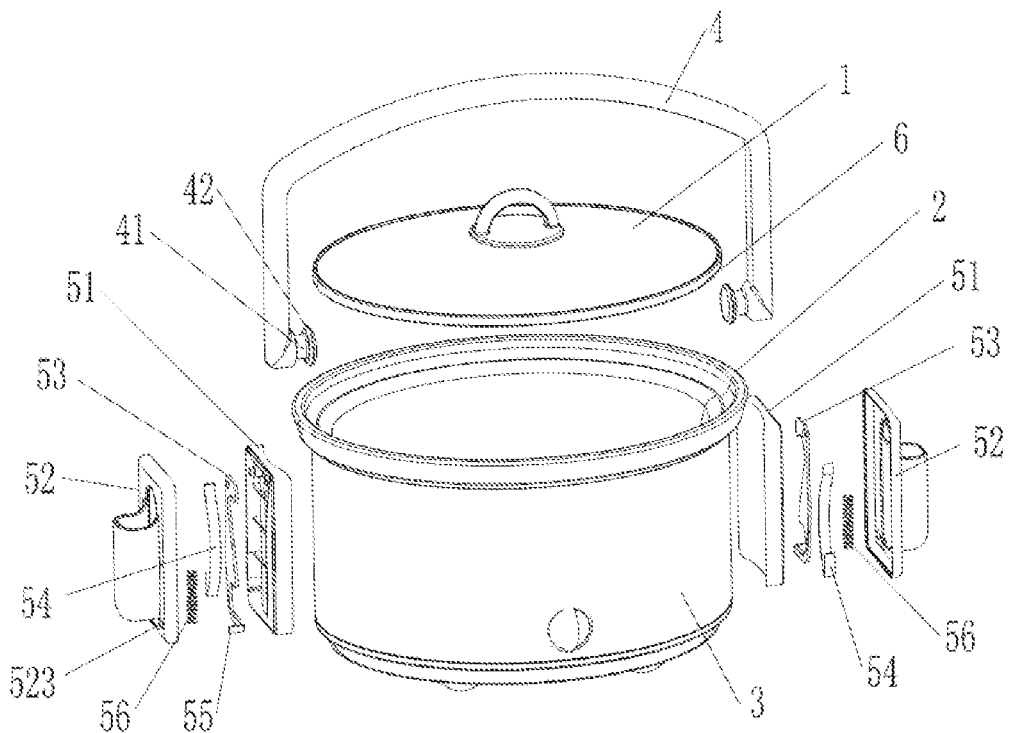
FIG. 2 is a structural exploded view of the first embodiment.
Figure 3:
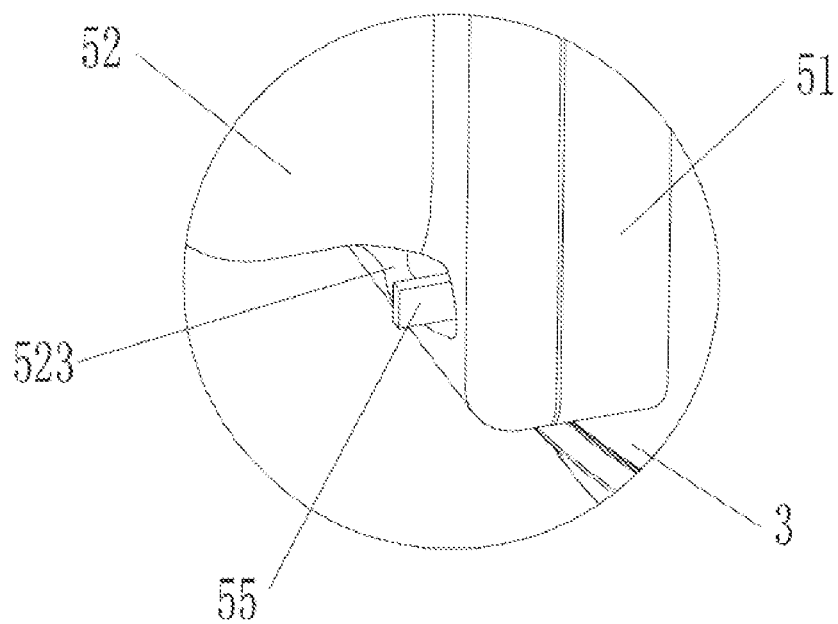
FIG. 3 is an enlarged view of A in FIG. 1.
Figure 12:
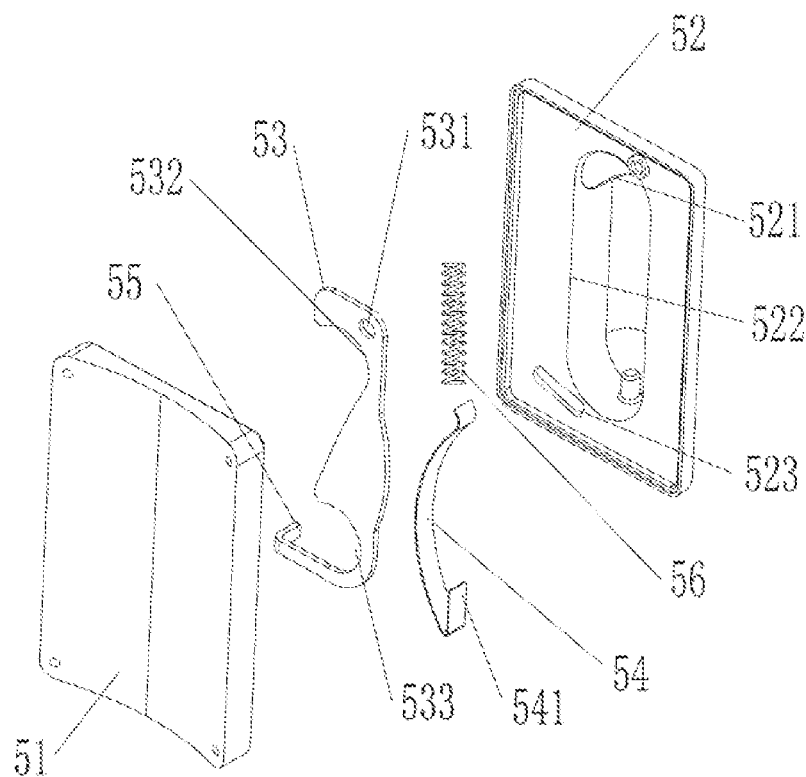
FIG. 12 is a structural exploded view of the handle box of the first embodiment.
Figure 13:
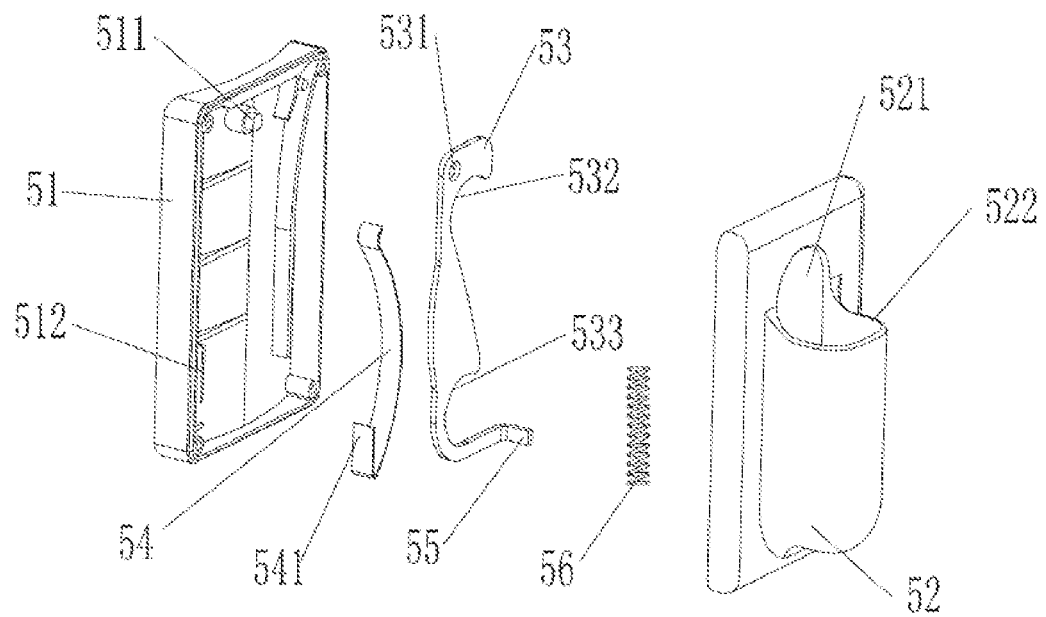
FIG. 13 is a structural exploded view in another angle of the handle box of the first embodiment.

As shown in FIGS. 2 and 12, the handle box 5 of the present embodiment comprises a box base 51, a box lid 52, a positioning buckle 53, a resetting spring sheet 54 and a trigger 55. The box base 51 was fixed to the cooking body 3 via fasteners, e.g., screws. The outside wall of the box base 51 is closely next to the side wall of the cooking body 3. The inner side wall of the box base is provided with a horizontally projecting spindle 511 and 512. The box lid 52 is fixed on the box base 51 via fasteners, e.g., screws, and a cavity is formed between the box lid 52 and the box base 51. Along the vertical direction of the outsider of the box lid 52 is provided with a locating cylinder 522, which has an upper end opened, for the upward and downward movement of the handle. A slide groove 521 is disposed on the box lid 52, corresponding to the locating cylinder 522, and the box lid 52 is provided with a hole 523 in the lower end.

The positioning buckle 53 of sheeting structure is provided with a axial-hole 531 and a fillister shaped higher latching position 532 in the upper end, and with a fillister shaped lower latching position in the lower end, wherein a cam shaped or inclined face transition is formed between the bottom of the higher latching position 532 and the top of lower latching position 533. The higher latching position 532 is the handling position of the handle box, and the lower latching position 533 is the fixed position of the handle box. Via the matching of the axial-hole 531 and the spindle 511, the positioning buckle 53 is assembled within the chamber between the box base 51 and the box lid 52.

The arc shaped resetting spring sheet 54, engaged at the side of the positioning buckle 53, has a hook 541 in the end which is matched with the edge 512 to fix the resetting spring sheet 54 within the chamber between the box base 51 and the box lid 52, The spring force formed by the resetting spring sheet 54 against the positioning buckle 53 enable the positioning buckle 53 to rotate around the spindle 511 in a certain angle.

The trigger 55 is utilized by users to overcome the spring force of the resetting spring sheet 54, enable the positioning buckle 53 to rotate in the reverse direction to relieve the locked status, to switch the handle 4 from the fixed position of the handle box 5 to the handle position. The trigger 55 and the positioning buckle 53 are integrally designed in the present embodiment. The trigger 55, horizontally projecting through the hole 523 in the lower end of the box lid 55, is positioned at the bottom of the positioning buckle 53. To obtain a similar effect, the trigger 55 may also be dependent from the positioning buckled, and then fixedly assembled together.

To increase the upward restoring force of the handle from the fixed position to the handle position, a spring 56, which has one end abutting on the end of the handle 4, and another end abutting on the bottom of the locating cylinder 522 of the box lid, can be further provided in the present embodiment.

Figure 10:
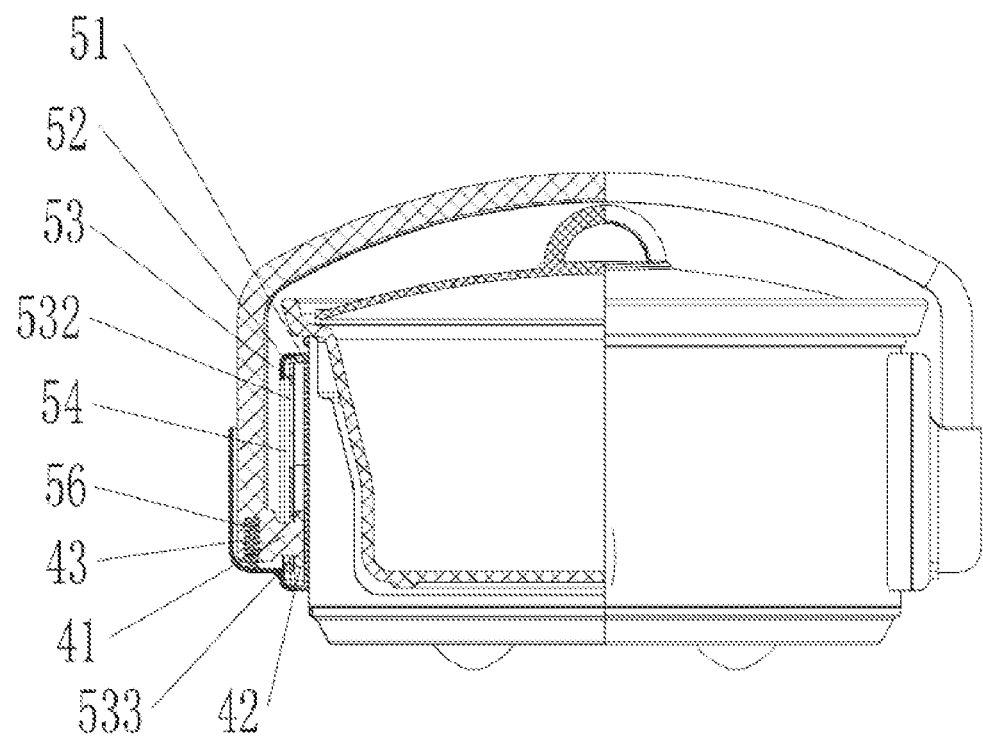
FIG. 10 is a cutaway view of the first embodiment in the locked state.

Referring to FIG. 10, each of the ends of the handle 4 is provided with a projecting rotate shaft 41 in the horizontal direction and a groove 43 in the vertical direction, in the present embodiment. A position-limiting projection 42 of a rather big size is provided at the end of the rotate shaft 41, to prevent the handle from sliding off the handle box. The groove 43 is use for engaging the spring 56, to locate the telescopic position of the spring 56.

Figure 4:
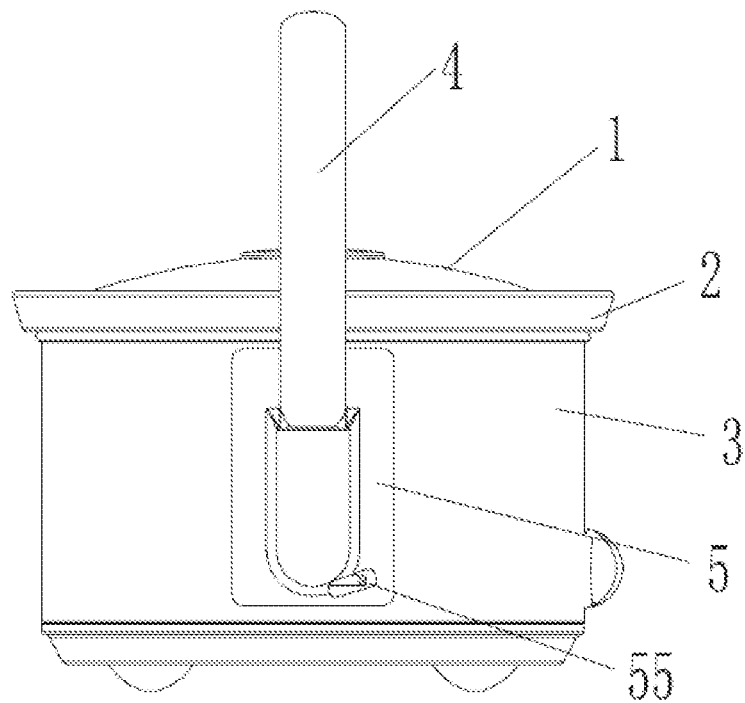
FIG. 4 is a side view of the first embodiment, wherein the lid is unlocked and the handle is displayed vertically.
Figure 5:
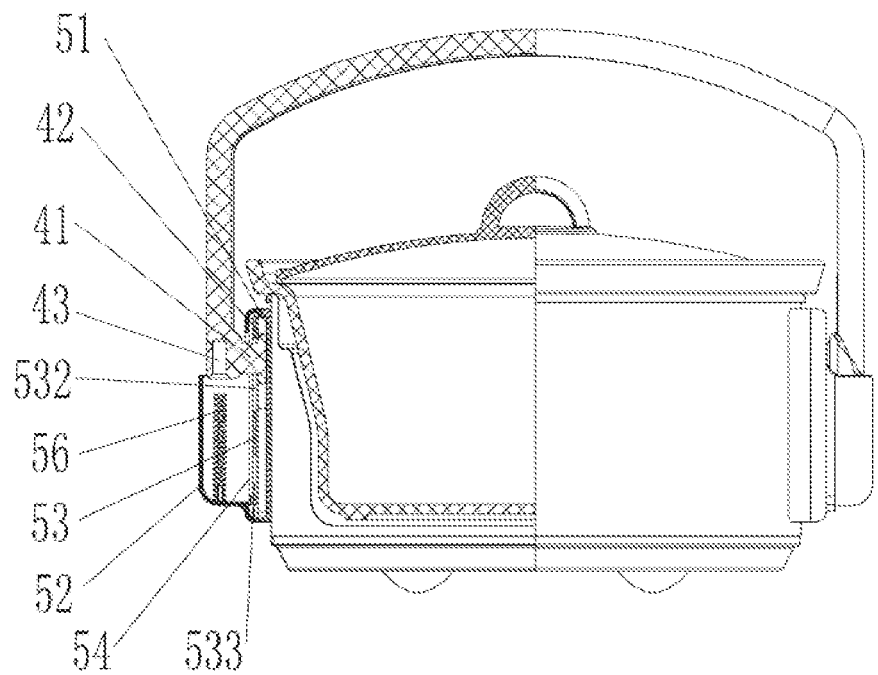
FIG. 5 is a cutaway view of the first embodiment, wherein the lid is unlocked and the handle is displayed vertically.
Figure 6:
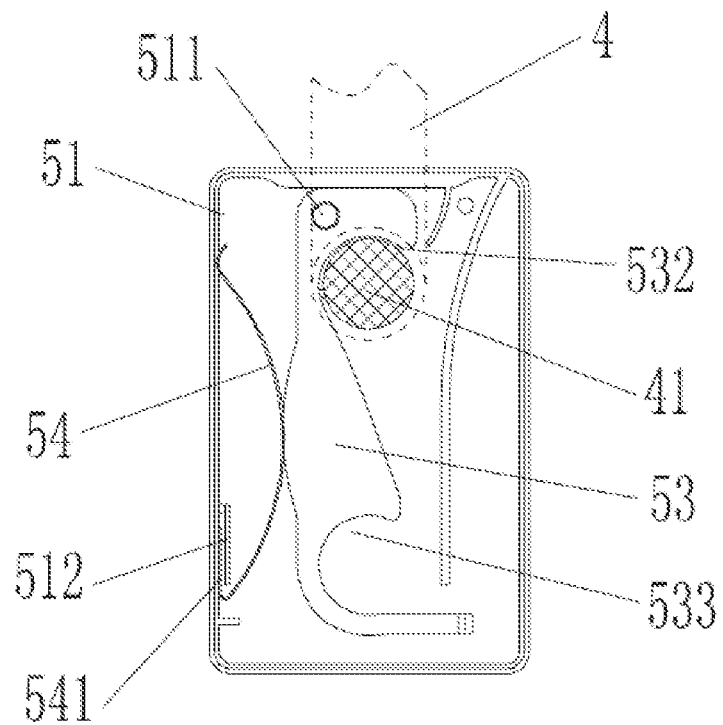
FIG. 6 is a schematic diagram of the handle box, wherein the lid is unlocked and the handle is displayed vertically.
Figure 7:
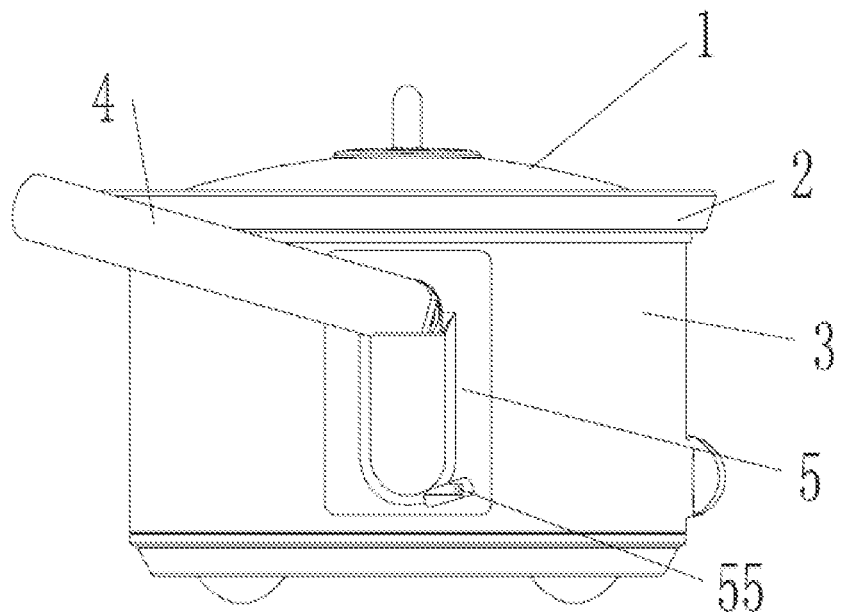
FIG. 7 is a side view of the first embodiment, wherein the lid is unlocked and the handle is tilted.

Moving mechanism of the present embodiment is as follows:

As shown in FIGS. 4, 5, 6, and 7, each of the ends of the handle is positioned at the opening of the locating cylinder 522. The position-limiting projection 42 of the handle goes through the slide groove 521 and the higher latching position 532 of the positioning buckle, to engage the rotate shaft 41 in the slide groove 521 and the higher latching position 532 of the positioning buckle in this circumstance, the positioning buckle 53, the resetting spring sheet 54 and the spring 56 are on the status of free resetting, where the handle 4 is fixed at the handle position of the handle box 5, not stressed, and may rotate around the rotate shaft 41, having not locked the lid 1 and the liner container 2. When the handle 4 rotates to a vertical direction as shown in FIG. 4, the rotate shaft 41 of the handle is engaged at the top of the slide groove 521, and the position-limiting projection 42 is engaged at the top of the higher latching position 532 of the positioning buckle, and therefore the handle is fixed within the handle box out any possibility of sliding off, and the slow cooker can be lifted by lifting the handle upward to move in a short distance. While the handle 4 rotates to an inclined direction as shown in FIG. 7, the liner container 2 and the lid 1 can be conveniently picked and placed.

Figure 8:
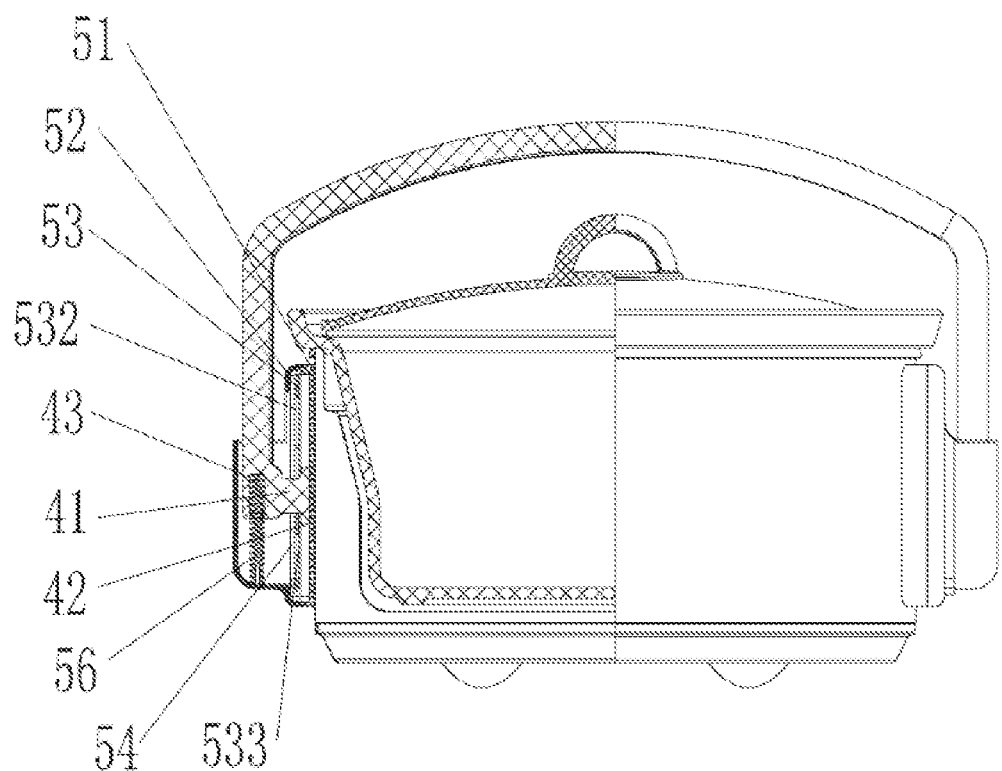
FIG. 8 is a cutaway view of the first embodiment in the transient state.
Figure 9:
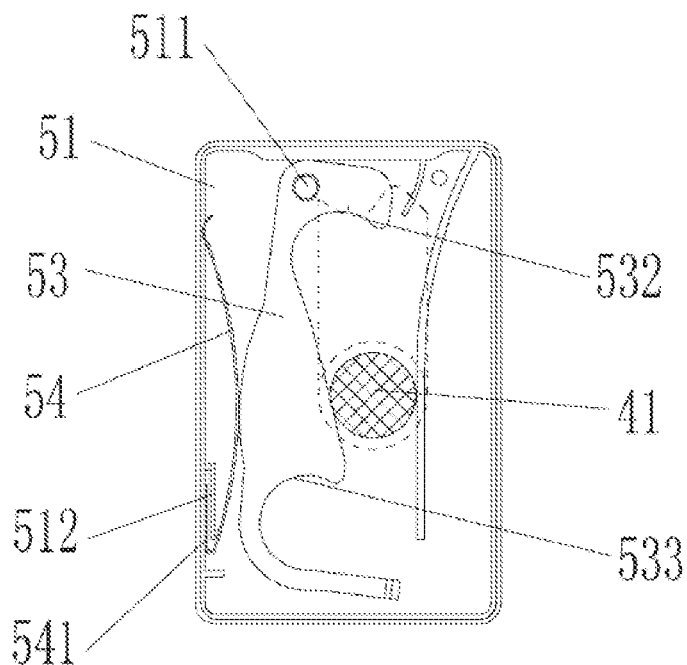
FIG. 9 is a schematic diagram of the handle box in the transient state.
Figure 11:
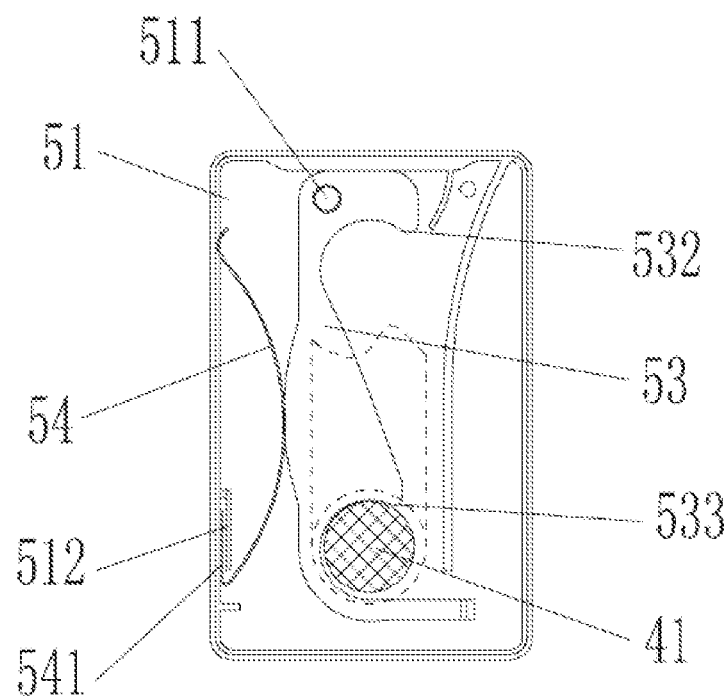
FIG. 11 is a schematic diagram of the handle box in the locked state.

As shown in FIGS. 8 and 9 when the handle is positioned in the vertical direction, unlocked, the handle 4 will overcome the force of the spring 56 to move along the locating cylinder 522 if a stress is forced on the handle 4 downward, then the rotate shaft 41 of the handle will move downward along the slide groove 521, and press the cam shaped junction between the higher latching position 532 and the lower latching position 532, making the positioning buckle press the resetting spring sheet 54 and rotate around the spindle 511, until the rotate shaft 41 move to the lower latching position 533 of the positioning buckle. As shown in FIGS. 10 and 11. The positioning buckle 53 rotates reversely under the reacting force of the resetting spring sheet 54, engaging the rotate shaft 41 at the lower latching position 533, and thus the handle 4 is fixed at the fixed position of the handle box. The handle 4 press tightly on the grip of the lid 1, forming a tight fitness among the lid 1, the sealing ring 6 and the liner container 2, in this locked status, food within the liner container will not spill out or pour out, and thus the whole slow cooker can be lifted, or be suitable for long distance movement, or be placed on cars or other carriers that may slightly jounce.

When the slow cooker is under locked status as shown in FIG. 10, the positioning buckle 53 can be driven to press the resetting spring sheet 54 and rotate around the spindle 511 by applying a horizontal force on the trigger 55. The rotate shaft 41 of the handle leave the lower latching position 533, and simultaneously, under the upward force by the users or the restoring force by the spring 56, the handle 4 drives the rotate shaft 41 to move upward along the locating cylinder 522, engaging the rotate shaft 41 at the higher latching position 532, and therefore, it returns to a free status, unlocked, as shown in FIG. 4, where the handle 4 can return from the fixed position of the handle box to the handle position.

Figure 14:
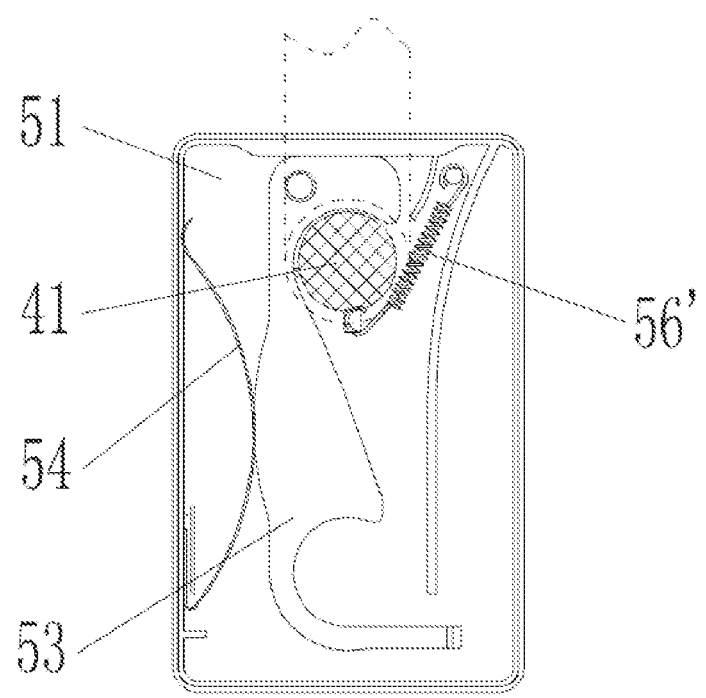
FIG. 14 is a transforming structural diagram of the handle box of the first embodiment.
Figure 15:
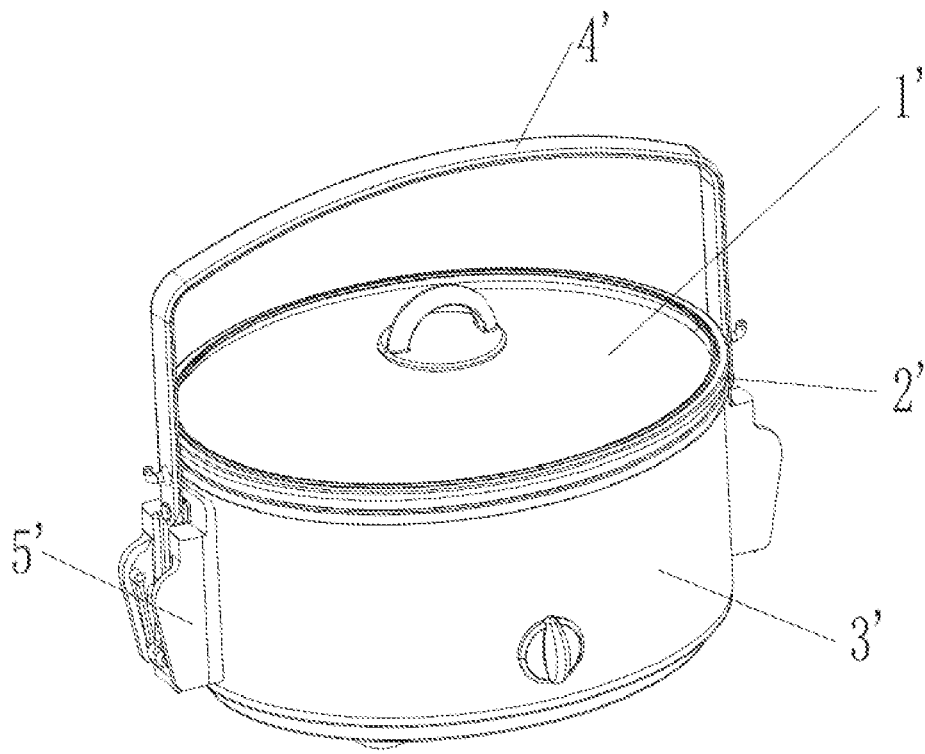
FIG. 15 is a structural installation diagram of the second embodiment.
Figure 16:
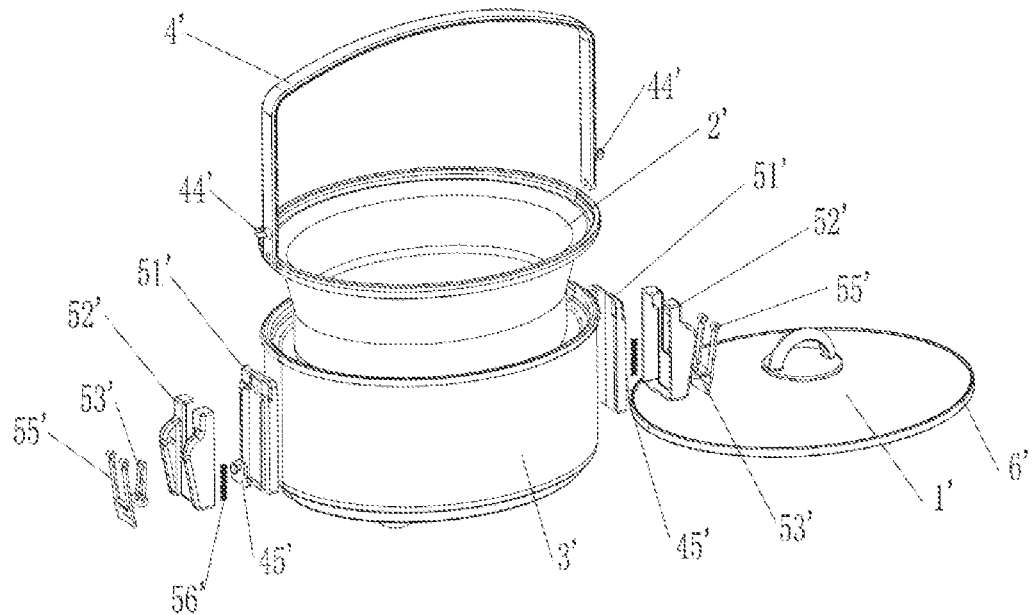
FIG. 16 is a structure exploded view of the second embodiment.

As shown in FIG. 14, the spring 56 in the present embodiment is substituted by a tension spring 56'. The tension spring 56', which has one end fixed on the box base, and another end fixed on the rotate shaft 41 of the handle, can be equally effective.

The resetting spring sheet 54 can be substituted by a compression spring in the present embodiment. The compression spring, which has one end abutting on the side wall of the box base, and another end abutting on the side wall of the positioning buckle, can be equally effective.

In the locked status of the present embodiment, the handle box 4 presses tightly on the grip of the lid 1, forming a tight fitness among the lid 1, the scaling ring 6 and the liner container 2. Of course, if the structure of the handle 4 is improved, it will still be within the protection scope of the present invention, e.g., the width of the handle 4 corresponding to the grip of the lid is broadened, and a hole is provided in the center, so that the handle 4 can avoid the grip of the lid 1, press tightly on other elements of the lid 1, forming a tight fitness among the lid 1, the sealing ring 6, and the liner container 2.

Embodiment 2

As shown in FIGS. 15 to 24, the slow cooker in the present embodiment includes a cooking body 3', an liner container 2' disposed within the cooking body 3', an lid 1' disposed on the liner container 2' covering the opening of the liner container 2', a handle 4', a handle box 5' fixed on the two end side surface of the cooking body 3', and a sealing ring 6' disposed around the outer rim of the lid 1'.

Different from the embodiment 1, the handle box 5' in the present embodiment includes a box base 51', a box lid 52', a positioning buckle 53', a trigger 55', and a spring 56". The box base 51' is fixed to the cooking body 3' via fasteners, e.g., screws. The outside wall of the box base 51' is closely next to the side wall of the cooking body 3'. The inner side wall of the box base 51' is provided with two parallel locating wings 513' in the vertical direction. A skid 514' for the upward and downward movement of the handle 4' is formed between the two locating wings 513'. A fillister 515' is provided at the top end of the skid 514', forming the handle position of the handle box 5' at the area of the fillister 515'. The fix position of the handle box 5' is formed at the lower end of the skid 514'.

The box lid 52' is fixed on the box base 51' via fasteners, e.g., screws, and a cavity is formed between the box lid 52' and the box base 51'. The upper part of the box lid 52' corresponding to the skid 514' of the box base is provided with a groove 524' for the assembly and movement of the handle 4'. Each of the two side walls of the groove 524' is provided with a horizontal extrusion facing toward the box base 51' at the top, and with a parallel barrier walls 525' in the vertical direction at the middle part, wherein the barrier walls 525' is provided with horizontally projecting assembling shafts 526', respectively, facing each other. The positioning buckle 53' of which the top end forms a latching position 534', and the lower end is provided with a snap-in hook 535', has an inverted U shape.

The upper end of the trigger 55' of the present embodiment is provided with two legs, each of which is provided with a sleeve 551' at the end, respectively. The size of the sleeve 551' is in correspondence with the assembling shaft 526' of the box lid, and by matching with the assembling shaft 526', the trigger 55' are driven to rotate around the assembling shaft 526'. At the middle part of the legs are provided with a support shaft 552' which forms a connection between the two legs. The size of the support shaft 552' is in correspondence with the snap-in hook 535' of the positioning buckle, and via the matching of the support shaft 552' and the snap-in hook 535', the positioning buckle 53' is rotatably fixed to the support shaft 552', forming a hinge structure with the trigger 55'.

To enhance the upward restoring force of the handle 4', a spring 56", which has one end abutting on the end of the handle 4, and another end abutting on the bottom of the handle box 5', is further provided in the present embodiment.

Each of the two ends of the handle 4' is provided with an outward projecting lock catch 44' When the trigger 55' rotate around the assembling shaft 526', the lock catch 44' can be engaged into the latching position 534' of the positioning buckle 53', enforcing the handle 4'. Slider 45' is respectively movably fixed to each of the ends of the handle box 4', via connecting elements 46', which has end designed as spherical surface to match with the fillister 515' of the skid. The slider 45' has an inverted T shape, defined within the skid 541' by the two side walls of the groove 524', the horizontal extrusion of the side wall and the barrier wall 525'.

Figure 17:
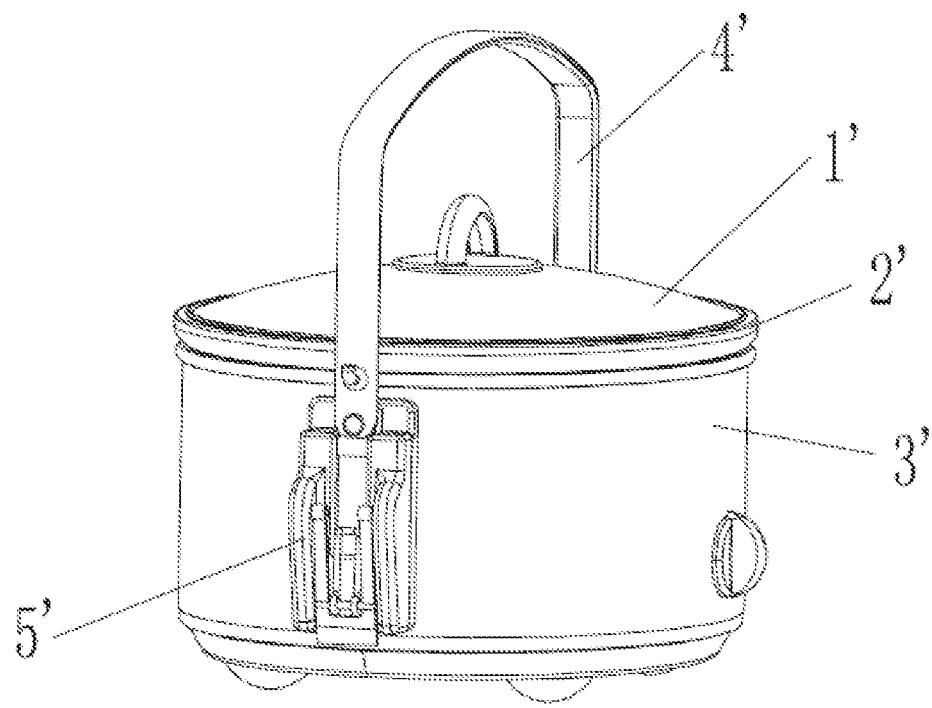
FIG. 17 is a schematic diagram of the second embodiment, wherein the lid is unlocked and the handle is displayed vertically.
Figure 18:
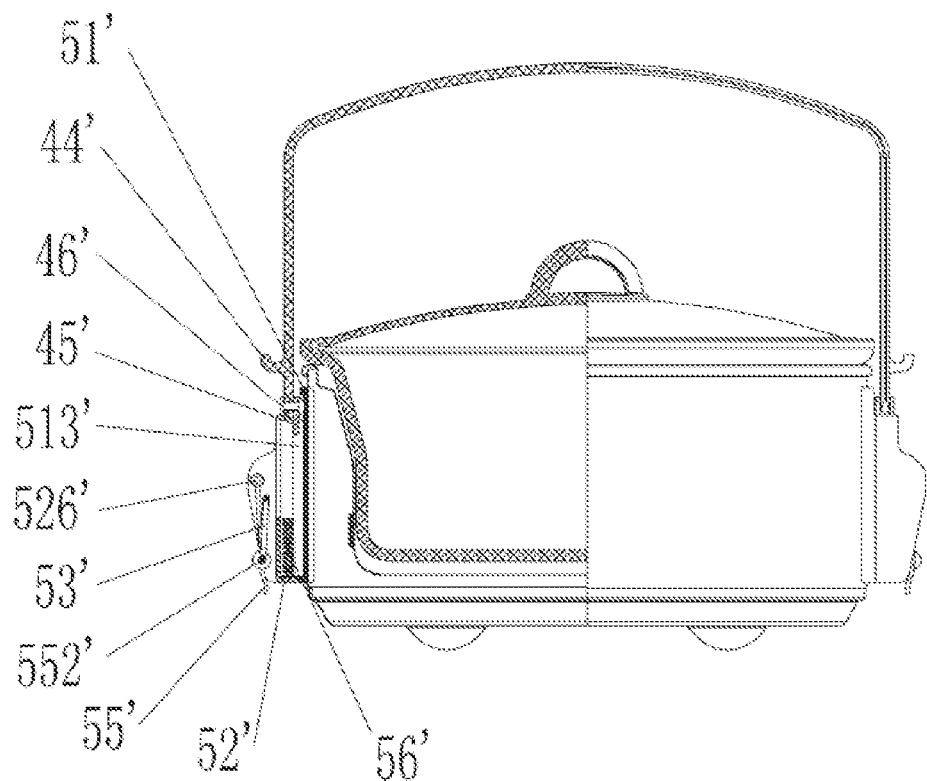
FIG. 18 is a cutaway view of the second embodiment, wherein the lid is unlocked and the handle is displayed vertically.
Figure 19:
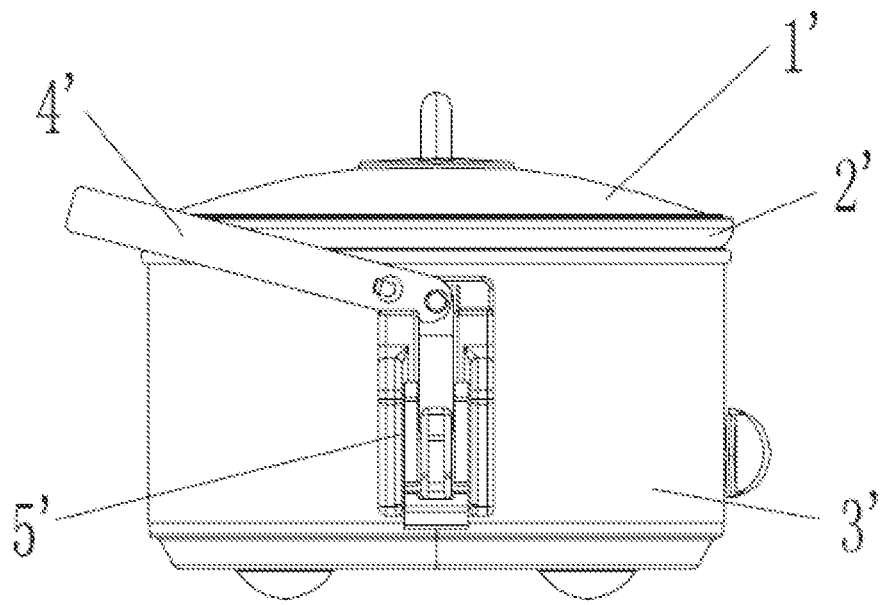
FIG. 19 is a side view of the second embodiment, wherein the lid is unlocked and the handle is leaning.

Moving mechanism of the present embodiment is as follows:

As shown in FIGS. 17 and 18, the slider 45' of the handle is disposed at the upper end of the skid 514', the spherical surface of the connecting element 46' is matched with the fillister 515' of the skid 514'. In this status, the handle 4' is fixed in the handle position of the handle box 5'. The positioning buckle 53', the trigger 55' and the spring 56" are on the status of free resetting, and the handle 4' are unstressed, having not locked the lid 1' and the liner container 2', and may rotate around the connecting element 46'. When the handle 4' rotates to the vertical direction as shown in FIG. 17, the slider 45' of the handle is located by the two side walls of the groove 524' and the horizontal extrusion at the top of the two said side walls: The handle 4' is restricted within the handle box 5'. Thus, the slow cooker can be lifted by lifting the handle 4' upward, and is suitable for picking and placing properly in a short distance. When the handle 4' rotates to an inclined direction as shown in FIG. 19, the liner container 2' and the lid 1' can be conveniently picked and placed.

Figure 20:
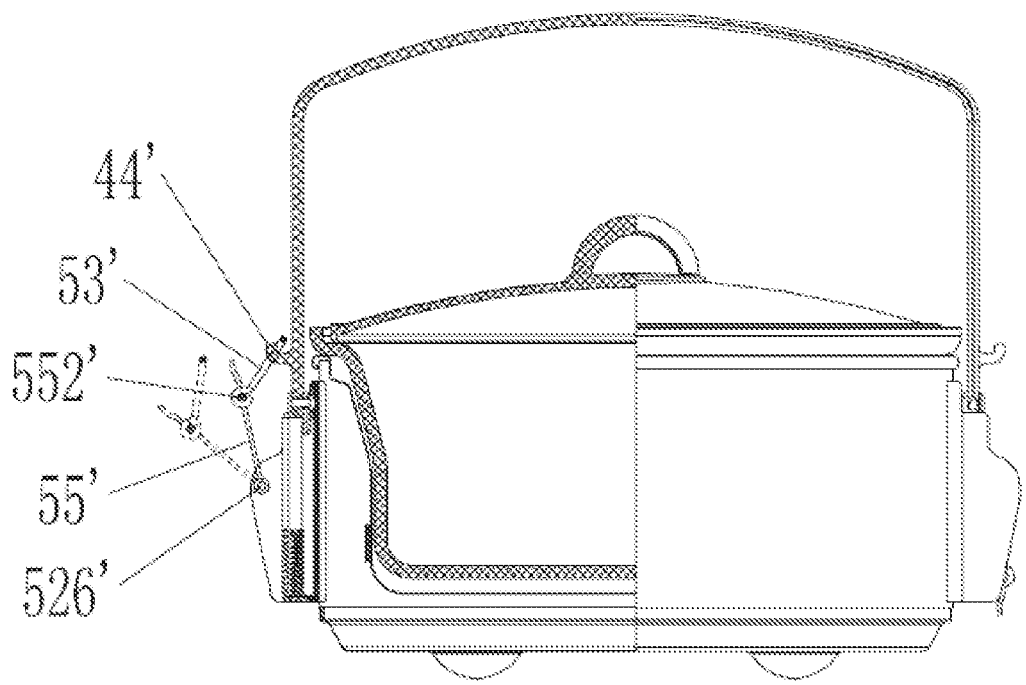
FIG. 20 is a cutaway view of the second embodiment in the transient state.
Figure 21:
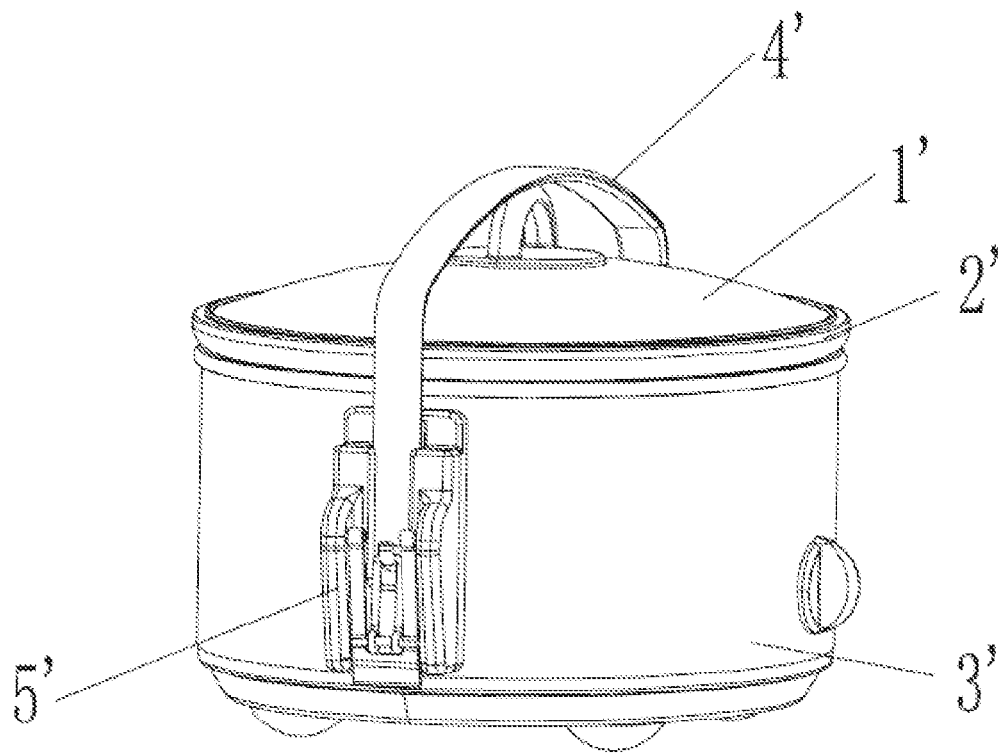
FIG. 21 is a schematic diagram of the second embodiment in the locked state.
Figure 22:
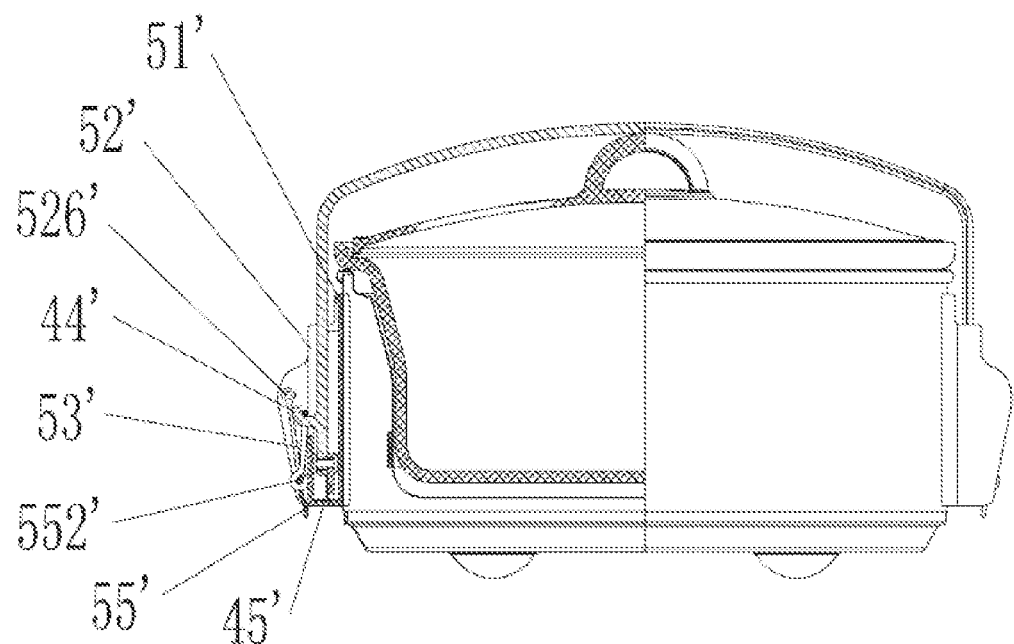
FIG. 22 is a cutaway view of the second embodiment in the locked state.
Figure 23:
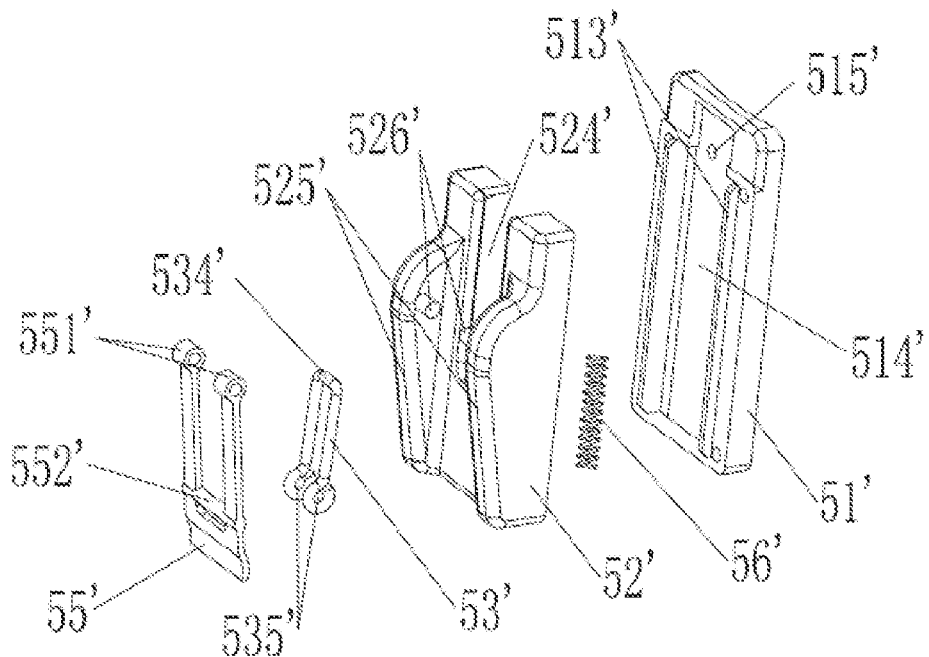
FIG. 23 is a structure exploded view of the handle box of the second embodiment.
Figure 24:
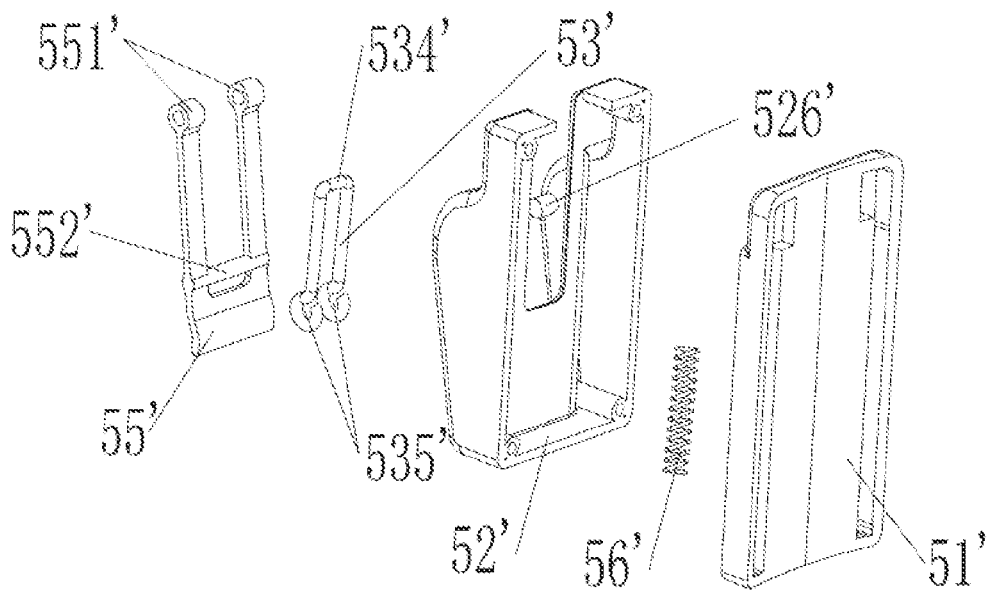
FIG. 24 is a structure exploded view in another angle of the handle box of the second embodiment.

As shown in FIG. 20, when the handle is in the vertical direction as shown in FIG. 17, unlocked, the trigger 55' will be driven to rotate upward around the assembling shaft 526' if the trigger 55' is forced, and thus the positioning buckle 53' removes upward, rotatable around the trigger 552'. When the trigger 55' and the positioning buckle 53' rotate through the dot line from the free status to the solid line as shown in the figure, the lock catch 44' can be engaged and interfered by the positioning buckle 53', and thus, the force of the spring 56" can be overcome by the handle 4' by applying a reacting force on the trigger 55', moving downward along the skid 514', until the handle 4' reaches the lower end of the skid 514' of the handle box. As shown in FIGS. 21 and 22. Because of the self-locking characters of the trigger 55', it will not release by itself, and thus the handle 4' is fixed at the fixed position of the handle box 5', pressing tightly on the lid 1', forming a tight fitness among the lid 1', the sealing ring 6' and the liner container 2'. Therefore, it is on the locked status, preventing the food within the liner container 2' from spilling out or pouring out. In this case, the whole slow cooker can be lifted, suitable for long distance movement, or for placing on cars or other carriers that may slightly jounce.

When the slow cooker is on the locked status, as shown in FIG. 21, the trigger can overcome the locking force of itself to rotate upward by applying a force on the trigger 55'. Thus the interference force on the handle by the positioning buckle 53' is released, and the handle 4' can make the slider 45' to move upward along the skid 514' of the box base, by the upward force applied by the users, or by the resetting force of the spring 56". Then, the connecting element 46' is matched with the fillister 516' of the box base, and the handle 4' returns to the higher latching position of the handle box 5', returning to the free status as shown in FIG. 17, unlocked, and therefore the handle 4' returns from the fixed position of the handle box 5' to the handle position.

What is claimed is:

1. A portable slow cooker, comprising
   a cooking body,
   a liner container disposed within the cooking body,
   a lid disposed on an opening of the liner container, and
   a handle, wherein:
      the handle is spanned over the lid and has lower ends in vertically slidable cooperation with handle boxes disposed at a side surface of the cooking body;
      the handle is locked by the handle boxes when the handle slides to a lowest position, so as to press the lid to form a sealing engagement with the liner container;

each lower end of the handle is provided with a lock catch, and the handle box is provided with a flexible pressing buckle that is matched with the lock catch to lock the handle at the lowest position; and each of the handle boxes comprises a box base, a box lid, a positioning buckle and a trigger, wherein:

a spring installed within each handle box is provided as a restoring mechanism, the box lid being mounted on the box base; and the trigger is rotatably connected to the handle box, the positioning buckle is rotatably connected to the trigger, and each lower end of the handle is rotatably connected to a slider sliding within the box base.

2. The portable slow cooker according to claim 1, wherein the handle is rotatable with respect to the handle boxes when the handle slides to a highest position.

3. The portable slow cooker according to claim 2, wherein the restoring mechanism is provided for supporting the handle.

4. The portable slow cooker according to claim 1, wherein the handle has an inverted U shape, with two lower ends inserted into the handle boxes to slide upward and downward, wherein the handle has a crossbar pressed against the lid when the handle slides to the lowest position.

5. The portable slow cooker according to claim 4, wherein the lid is provided with a grip, which is pressed by the crossbar of the handle when the handle is at the lowest position.

6. A portable slow cooker, comprising
a cooking body,
a liner container disposed within the cooking body,
a lid disposed on an opening of the liner container, and
a handle, wherein:

the handle is spanned over the lid and has lower ends in vertically slidable cooperation with handle boxes disposed at a side surface of the cooking body;

the handle is locked by the handle boxes when the handle slides to a lowest position, so as to press the lid to form a sealing engagement with the liner container;

each of the handle boxes is provided with a two-stage positioning mechanism, in correspondence with a highest position and a lowest position of the handle, respectively; and each of the handle boxes comprises a box base, a box lid, a positioning buckle, a resetting spring sheet and a trigger, wherein the positioning buckle, the resetting spring sheet and the trigger are installed between the box lid and the box base; a spring is installed within the handle box as a restoring mechanism; at one side of the positioning buckle is provided with a higher latching point and a lower latching point; at the other side of the positioning buckle is provided with the resetting spring sheet supporting the positioning buckle, which is pushed by the trigger to press against the resetting spring sheet; at each lower end of the handle is provided with a projecting rotate shaft to match with the higher latching point and the lower latching point of the positioning buckle.

7. The portable slow cooker according to claim 6, wherein a position-limiting projection is provided to an end part of the rotate shaft disposed at each lower end of the handle.

* * * * *